US009864702B2

(12) United States Patent
Van De Ven

(10) Patent No.: US 9,864,702 B2
(45) Date of Patent: *Jan. 9, 2018

(54) TECHNIQUES TO PRELINK SOFTWARE TO IMPROVE MEMORY DE-DUPLICATION IN A VIRTUAL SYSTEM

(71) Applicant: INTEL CORPORATION, Santa Clara, CA (US)

(72) Inventor: Adriaan Van De Ven, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/878,971

(22) Filed: Oct. 8, 2015

(65) Prior Publication Data

US 2016/0267013 A1    Sep. 15, 2016

Related U.S. Application Data

(63) Continuation of application No. 13/997,988, filed as application No. PCT/US2011/063830 on Dec. 7, 2011, now Pat. No. 9,170,940.

(51) Int. Cl.
*G06F 12/00* (2006.01)
*G06F 12/109* (2016.01)
(Continued)

(52) U.S. Cl.
CPC ............ *G06F 12/109* (2013.01); *G06F 8/54* (2013.01); *G06F 9/44521* (2013.01);
(Continued)

(58) Field of Classification Search
None
See application file for complete search history.

(56) References Cited

U.S. PATENT DOCUMENTS

2006/0212468 A1* 9/2006 Harscoet .................. G06F 9/445
2010/0299667 A1* 11/2010 Ahmad ............... G06F 12/1018
718/1

OTHER PUBLICATIONS

Suzaki et al., "Moving from Logical Sharing of Guest OS to Physical Sharing of Deduplication on Virtual Machine", Proceedings of the 5th USENIX conference on Hot topics in security, Aug. 10, 2010, 6 pages.

* cited by examiner

*Primary Examiner* — Duc Doan

(57) ABSTRACT

Techniques to prelink software to improve memory de-duplication in a virtual system are described. An apparatus may comprise a processor circuit, a memory unit coupled to the processor circuit to store private memory pages for multiple virtual machines, and a dynamic linker application operative on the processor circuit to link a binary version of a software program with associated program modules at run-time of the binary version on a virtual machine. The dynamic linker application may comprise a master prelink component operative on the processor circuit to relocate a first set of program modules for a first binary version of the software program for a first virtual machine using a first set of virtual memory addresses from a first private memory page allocated to the first virtual machine, and store relocation information for the first set of program modules in a global prelink layout map for use by a second virtual machine. Other embodiments are described and claimed.

25 Claims, 11 Drawing Sheets

(51) Int. Cl.
*G06F 12/02* (2006.01)
*G06F 9/445* (2006.01)
*G06F 9/455* (2006.01)

(52) U.S. Cl.
CPC ...... *G06F 9/45558* (2013.01); *G06F 12/0284* (2013.01); *G06F 9/45533* (2013.01); *G06F 2009/45583* (2013.01); *G06F 2212/1016* (2013.01); *G06F 2212/1044* (2013.01); *G06F 2212/151* (2013.01); *G06F 2212/657* (2013.01); *Y02B 60/1225* (2013.01)

700

RELOCATE A FIRST SET OF PROGRAM MODULES FOR A FIRST BINARY VERSION OF A SOFTWARE PROGRAM FOR A FIRST VIRTUAL MACHINE USING A FIRST SET OF VIRTUAL MEMORY ADDRESSES FROM A FIRST PRIVATE MEMORY PAGE ALLOCATED TO THE FIRST VIRTUAL MACHINE
702

STORE RELOCATION INFORMATION FOR THE FIRST SET OF PROGRAM MODULES IN A GLOBAL PRELINK LAYOUT MAP
704

RETRIEVE THE GLOBAL PRELINK LAYOUT MAP
706

RELOCATE A SECOND SET OF PROGRAM MODULES FOR A SECOND BINARY VERSION OF THE SOFTWARE PROGRAM FOR A SECOND VIRTUAL MACHINE USING A SECOND SET OF VIRTUAL MEMORY ADDRESSES FROM A SECOND PRIVATE MEMORY PAGE ALLOCATED TO THE SECOND VIRTUAL MACHINE BASED ON THE GLOBAL PRELINK LAYOUT MAP
708

> RELOCATE A PROGRAM MODULE FROM THE FIRST SET OF PROGRAM MODULES BY CHANGING EACH MODULE ADDRESS REFERENCED IN THE PROGRAM MODULE TO A VIRTUAL MEMORY ADDRESS FROM THE FIRST SET OF VIRTUAL MEMORY ADDRESSES OF THE FIRST PRIVATE MEMORY PAGE
> *802*

> RELOCATE A PROGRAM MODULE FROM THE SECOND SET OF PROGRAM MODULES BY CHANGING EACH MODULE ADDRESS REFERENCED IN THE PROGRAM MODULE TO A VIRTUAL MEMORY ADDRESS FROM THE SECOND SET OF VIRTUAL MEMORY ADDRESSES OF THE SECOND PRIVATE MEMORY PAGE, WHEREIN THE FIRST SET OF VIRTUAL MEMORY ADDRESSES OF THE FIRST PRIVATE MEMORY PAGE MATCHES THE SECOND SET OF VIRTUAL MEMORY ADDRESSES OF THE SECOND PRIVATE MEMORY PAGE
> *804*

```
RETRIEVE THE FIRST PRIVATE MEMORY PAGE ALLOCATED
TO THE FIRST VIRTUAL MACHINE AND THE SECOND
PRIVATE MEMORY PAGE ALLOCATED TO THE SECOND
VIRTUAL MACHINE
1002
```

```
COMPARE THE FIRST AND SECOND PRIVATE MEMORY
PAGES FOR DUPLICATIVE CONTENT
1004
```

```
MERGE THE FIRST AND SECOND PRIVATE MEMORY PAGES
TO FORM A SHARED MEMORY PAGE WHEN THE FIRST AND
SECOND PRIVATE MEMORY PAGES HAVE DUPLICATIVE
CONTENT
1006
```

FIG. 10

TECHNIQUES TO PRELINK SOFTWARE TO IMPROVE MEMORY DE-DUPLICATION IN A VIRTUAL SYSTEM

CROSS-REFERENCE TO RELATED APPLICATIONS

This application is a continuation of, claims the benefit of and priority to previously filed U.S. patent application Ser. No. 13/997,988 filed Jun. 25, 2013, entitled "TECHNIQUES TO PRELINK SOFTWARE TO IMPROVE MEMORY DE-DUPLICATION IN A VIRTUAL SYSTEM", which is a US national stage entry of PCT/US2011/063830; both of the above are incorporated herein by reference in their entirety.

BACKGROUND

A virtual machine (VM) is a software implementation of a machine (e.g., a computer) that executes programs like a physical machine. Virtual machines are separated into two major categories, based on their use and degree of correspondence to any real machine. A system virtual machine provides a complete system platform which supports the execution of a complete operating system (OS). In contrast, a process virtual machine is designed to run a single program, which means that it supports a single process. An essential characteristic of a virtual machine is that the software running inside is limited to the resources and abstractions provided by the virtual machine.

With only a small percentage of a physical machine in use at a given time, virtualization allows a physical machine to be shared to increase its overall utilization. One design factor with virtualization is efficient sharing of hardware resources provided by a physical machine, such as processor, memory and networking bandwidth. Processor and networking resources are typically underutilized even in a virtual environment. However, memory resources are often in high demand. Therefore, memory management techniques directed to efficient memory sharing in a virtual environment potentially enables virtual machines to be more dynamic, power efficient and cost efficient. It is with respect to these and other considerations that the present improvements have been needed.

BRIEF DESCRIPTION OF THE DRAWINGS

FIG. 7 illustrates an embodiment of a first logic flow for a memory management apparatus of a virtual machine.

FIG. 8 illustrates an embodiment of a second logic flow for a memory management apparatus of a virtual machine.

FIG. 10 illustrates an embodiment of a fourth logic flow for a memory management apparatus of a virtual machine.

DETAILED DESCRIPTION

Figure 1:
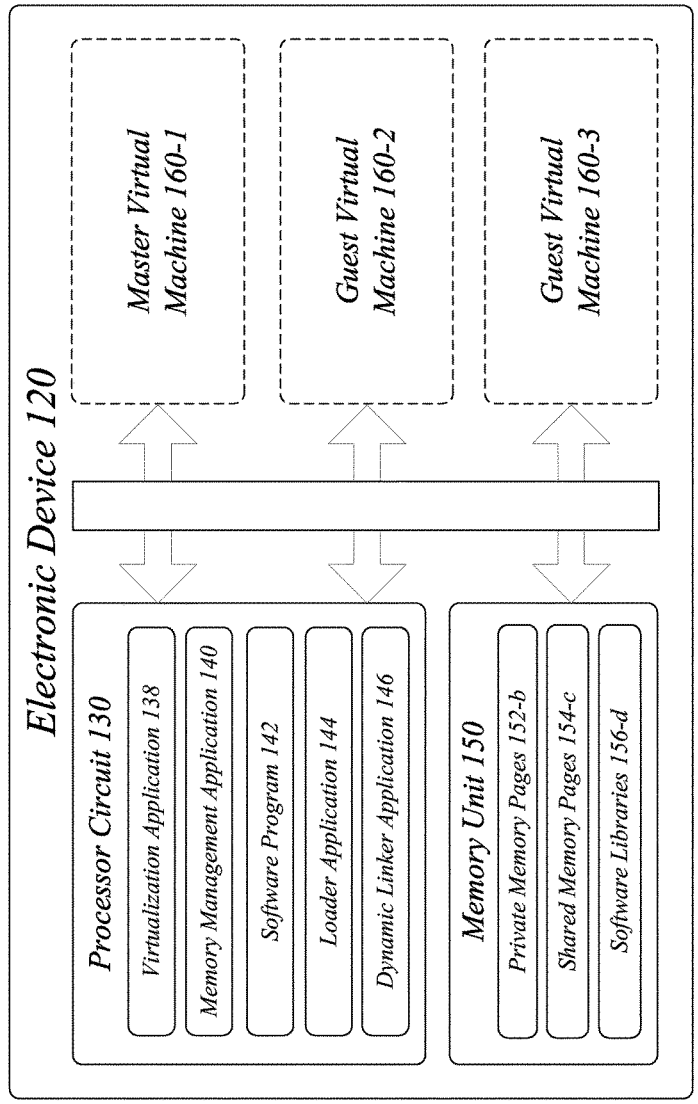
FIG. 1 illustrates an embodiment of a first memory management apparatus of a virtual machine.

Various embodiments are generally directed to virtualized systems. Some embodiments are particularly directed to enhanced memory management techniques for virtualized systems supporting multiple virtual machines. In one embodiment, for example, prelinking operations for software programs may be performed in a manner to facilitate and support memory management operations for a virtual system.

As discussed in more detail below, a virtual system typically implements both prelinking techniques to improve program load times and memory management techniques to improve memory usage. In conventional virtual systems, prelinking and memory management are treated as distinct and separate procedures. However, prelinking operations may significantly impact memory management operations. Current optimizations for prelinking operations include a randomization component that randomizes memory addresses used by a software program and associated software libraries. Randomizing memory addresses makes it more difficult for memory management techniques to locate and merge duplicative content in memory. This creates a significant performance penalty for memory management techniques in a virtual system.

To solve these and other problems, various embodiments implement enhanced prelinking techniques for software programs specifically designed to improve memory management operations of a virtual system. A virtual system may implement multiple virtual machines, each allocated one or more private memory pages in a private memory segment of a memory unit. In those cases where multiple virtual machines utilize identical software programs and associated libraries, the enhanced prelinking techniques removes a randomization component for relocation operations of the associated libraries, thereby allowing the associated libraries to be stored using a known virtual address space in different private memory pages. A memory management technique, such as memory de-duplication, may locate multiple private memory pages storing the identical libraries using the known virtual address space, and transform the multiple private memory pages into a shared memory page for the virtual machines. This allows more efficient memory sharing in a virtual environment, and potentially enables virtual machines to be more dynamic, power efficient and cost efficient. As a result, the embodiments can improve affordability, scalability, modularity, extendibility, or interoperability for an operator, device or network.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a memory management apparatus 100. In one embodiment, the memory management apparatus 100 may comprise a computer-implemented apparatus comprising an electronic device 120 having one or more processor circuits 130 and a memory unit 150. The electronic device 120 may further have installed specialized software programs including a virtualization application 138, a memory management application 140, a software program 142, a loader application 144, and a dynamic linker application 146. Although the memory management apparatus 100 shown in FIG. 1 has a limited number of elements in a certain topology, it may be appreciated that the memory management apparatus 100 may include more or less elements in alternate topologies as desired for a given implementation.

In various embodiments, the memory management apparatus 100 may comprise an electronic device 120. Examples of an electronic device 120 may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

In various embodiments, the memory management apparatus 100 may comprise a processor circuit 130. The processor circuit 130 may comprise a general purpose processor circuit used for general purpose computing, such as a central processing (CPU) for a computing platform. The processor circuit 130 can be any of various commercially available general purpose processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processor circuit 130. The embodiments are not limited in this context.

In various embodiments, the memory management apparatus 100 may comprise a memory unit 150. The memory unit 150 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD)), and any other type of storage media suitable for storing information. The embodiments are not limited in this context.

In the illustrated embodiment shown in FIG. 1, the processor circuit 130 may be arranged to execute specialized software programs including a virtualization application 138, a memory management application 140, a software program 142, a loader application 144, and a dynamic linker application 146. Although these software programs are illustrated and described as executed by the processor circuit 130, it may be appreciated that some portions or all of these software programs may be executed by other processor circuits implemented by the electronic device 120, such as a graphics processing unit (GPU), a baseband processor for a transceiver, and so forth. The embodiments are not limited in this context.

As shown in FIG. 1, the memory management apparatus 100 may include a virtualization application 138. The virtualization application 138 is generally arranged to install and manage multiple virtual machines 160-a on the electronic device 120. In general, a virtual machine 160-a is an abstract or simulated computer architecture that can be implemented in hardware or software. Either implementation is intended to be included in the following descriptions of a virtual machine 160-*a*. In one embodiment, for example, a virtual machine 160-*a* is a software implementation of a machine that executes programs like a physical machine, such as the electronic device 120. The virtualization application 138 may implement a virtual machine 160-*a* as a system virtual machine that provides a complete system platform capable of supporting execution of a complete operating system (OS) and/or application programs, represented as software program 142. Additionally or alternatively, the visualization application 138 may implement a virtual machine 160-*a* as a process virtual machine designed to run a single program, which means that it supports a single process. The virtual machines 160-*a* may use or share various hardware resources provided by the electronic device 120, such as the processor circuit 130 and the memory unit 150, among other computing and communications platform components implemented by the electronic device 120.

The virtualization application 138 may be implemented using any number of known virtualization software and/or hardware platforms. Examples for the visualization application 138 may include without limitation virtualization applications such as Kernel-based Virtual Machine (KVM)® made by Red Hat®, Inc., Oracle® VM® made by Oracle Corporation, VMware® ESX® made by VMware, Inc., and VxWorks® made be Wind River Systems®, Inc., z/VM® made by International Business Machines® Corporation, and similar virtualization platforms. The embodiments are not limited in this context.

Although various embodiments are described in the context of virtual machines 160-*a* as created and managed by the virtualization application 138, it may be appreciated that some embodiments may be implemented for any electronic device 120 providing a hardware platform that is segmented into multiple, discrete, computing portions. For instance, various embodiments may be implemented using system partitions that separate a single hardware platform into multiple hardware sub-systems. For instance, a hardware platform having multiple processors and memory units may be partitioned into two hardware sub-systems, each having a processor and a memory unit. The embodiments are not limited in this context.

It is worthy to note that "a" and "b" and "c" and similar designators as used herein are intended to be variables representing any positive integer. Thus, for example, if an implementation sets a value for a=5, then a complete set of virtual machines 160-*a* may include virtual machines 160-1, 160-2, 160-3, 160-4 and 160-5. The embodiments are not limited in this context.

The virtualization application 138 may implement any number of virtualization techniques to create the virtual machines 160-*a*, including a virtual machine manager (VMM) or a hypervisor, among other virtualization techniques. In various embodiments, there are two general types of virtual machines 160-*a*. A first type is a master virtual machine. A second type is a guest virtual machine. A master virtual machine is the main virtual machine and generally manages operations for one or more guest virtual machines. For instance, a VMM may execute in the master virtual machine to provide a virtual operating platform for guest virtual machines and manage execution of guest operating systems. A guest virtual machine follows control directives from the VMM executing in a master virtual machine. A typical implementation has a single master virtual machine, and multiple guest virtual machines. As shown in FIG. 1, for example, the virtualization application 138 may implement a VMM to create a master virtual machine 160-1, and guest virtual machines 160-2, 160-3. It may be appreciated, however, that there may be any number of master virtual machines and guest virtual machines in various combinations. For instance, a virtual system may have multiple master virtual machines, each controlling operations for different sets of guest virtual machines. The embodiments are not limited in this context.

The memory management apparatus 100 may include a memory management application 140. The memory management application 140 is generally arranged to perform memory management operations for a set of virtual machines 160-*a*. Each virtual machine 160-*a* may be allocated a discrete portion of memory, such as a private memory segment, from the memory unit 150. Each virtual machine 160-*a* may then read and write a set of private memory pages 152-*b* to its private memory segment. A private memory page 152-*b* is a memory page which has restricted access. For example, the virtualization application 138 implements security measures to ensure a first virtual machine 160-1 may not access private memory pages 152-*b* for a second virtual machine 160-2, and vice-versa.

In general, a memory page (sometimes referred to as a virtual page or simply page) is a fixed-length contiguous block of virtual memory that is a smallest unit for memory allocation by an operating system for a program and transfer between main memory and an auxiliary store, such as a hard disk drive. Page size is usually determined by processor architecture. Traditionally, pages in a system had uniform size, for example 4096 bytes. However, modern processor designs often allow two or more, sometimes simultaneous, page sizes due to the benefits and penalties. There are several points that can factor into choosing a given page size, including factors such as page size versus page table size, page size versus translation lookaside buffer (TLB) usage, internal fragmentation of pages, page size versus disk access, and so forth.

In one embodiment, the virtual machines 160-*a* may execute similar operating systems and application programs, such as different versions of a software program 142. When executing an identical software program 142 on each of multiple virtual machines 160-*a*, many private memory pages 152-*b* for those virtual machines 160-*a* are identical as well. When private memory pages 152-*b* are identical and therefore have duplicative content, they can be consolidated into a shared memory page 154-*c*, thereby releasing memory for use in other applications. For example, a shared memory page 154-1 may be accessed by a set of multiple virtual machines 160-1, 160-2 having the identical private memory pages 152-1, 152-2, respectively, used to create the shared memory page 154-1. In this sense the shared memory page 154-1 is still private in that the shared memory page 154-1 may not be accessed by other virtual machines 160-*a* outside of the virtual machines 160-1, 160-2.

The memory management application 140 may implement one or more background processing threads or daemons that periodically perform scans of private memory pages 152-*b* to identify duplicate (or identical) memory pages, and merge duplicate memory pages together to form a shared memory page 154-*c*. In one embodiment, a shared memory page 154-*c* may be subsequently marked as a read-only file. In one embodiment, merge operations may be performed using a copy-on-write (CoW) technique. The memory de-duplication process releases memory resources from the memory unit 150 for use by other applications.

When a virtual machine 160-*a* changes a shared memory page 154-*c* for any reason, then the memory management application 140 may provide a new private memory page 152-*b* for the virtual machine 160-*a* making the change.

The memory management apparatus 100 may include a software program 142. The software program 142 may comprise any independent software program suitable for execution by the processor circuit 130. Examples of software program 142 may include system programs and application programs. System programs generally may assist in the running of the electronic device 120 and may be directly responsible for controlling, integrating, and managing the individual software and hardware components of a computer system. Examples of system programs may include, without limitation, an operating system (OS), device drivers, programming tools, utility programs, software libraries, application programming interfaces (APIs), and so forth. Application programs generally may allow a user to accomplish one or more specific tasks. Examples of application programs may include, without limitation, one or more messaging applications (e.g., telephone, voicemail, facsimile, e-mail, instant messaging, short messaging service, multimedia messaging service, video conferencing), a web browser application, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, productivity applications, enterprise applications, and so forth. In various implementations, the application programs may provide one or more graphical user interfaces (GUIs) to communicate information between the electronic device 120 and a user. The embodiments are not limited in this context.

The memory management apparatus 100 may include a loader application 144. The loader application 144 is a software program generally responsible for loading a software program 142 into the memory unit 150 and preparing it for execution by the processor circuit 130. The entire software program 142 may be loaded at once before execution, or loaded in stages when actually needed during execution (e.g., using a memory-mapped file technique). In many cases, a software program 142 may utilize one or more software libraries 156-*d* to function. A software library 156-*d* contains a collection of discrete sets of code and data, referred to herein as program modules, which provide services to independent software programs such as the software program 142. In such cases, the loader application 144 also needs to locate and load program modules from a software library 156-*d* used by the software program 142 during load operations.

The memory management apparatus 100 may include a dynamic linker application 146. The dynamic linker application 146 is generally responsible for linking a software program 142 and one or more program modules from one or more software libraries 156-*d*. Since a software program 142 and program modules from a software library 156-*d* are independent programs, to facilitate modular programming, the software program 142 and the program modules typically refer to each other using symbols. In some cases, the symbols used by each program may be different or undefined. The dynamic linker application 146 resolves these symbols to allow the software program 142 and any associated program modules from a software library 156-*d* to operate as a unified executable program. The dynamic linker application 146 performs dynamic linking operations during run-time of the software program 142. By way of contrast, a static linker is typically used at compile-time to produce a binary version of a software program (e.g., an executable file). For instance, the dynamic linker application 146 resolves symbols during run-time, while a static linker resolves symbols during compile-time.

The dynamic linker application 146 provides significant advantages in code size and management. However, dynamic linking increases complexity for the loader application 144. The loader application 144 needs to locate a software program 142 and associated program modules from a software library 156-*d* every time the software program 142 is executed. For security reasons, a software library 156-*d* is moved around in a process address space. For instance, address space layout randomization is a security technique that randomly arranges positions of key data areas in the memory unit 150, including the software libraries 156-*d*, to make it more difficult for an attacker to predict target addresses. However, since a software library 156-*d* can move, the loader application 144 incurs a performance penalty when locating the software library 156-*d* in order to load with the software program 142. The more software libraries 156-*d* to resolve, the larger the performance penalty.

To compensate for this performance penalty, the dynamic linker application 146 may implement prelinking operations (also called prebinding). Prelinking is a process of linking an executable file, such as a binary version of the software program 142, with program modules from a software library 156-*d* after compile-time but before run-time of the executable file on the processor circuit 130. This reduces program load time (or boot time) for the software program 142. However, security techniques such as address space layout randomization cannot be used with prelinking since to do so would require relocating the software libraries 156-*d* in the memory unit 150, thereby defeating any advantages of prelinking. In an attempt to restore some of the benefits of address space layout randomization, conventional prelinking operations randomly selects addresses used for prelinking. This makes it more difficult to perform certain attacks on a system, because the addresses used for prelinking are unique to that system.

While prelinking with random addresses seems a viable solution for physical machines using a single process space and address space, prelinking with random addresses causes a performance penalty for the memory management application 140 used by a virtual system, such as illustrated by the memory management apparatus 100. The memory management application 140 may implement memory de-duplication techniques to detect duplicate private memory pages 152-*b* and share them among multiple virtual machines 160-*a*. However, prelinking with random addresses causes software libraries 156-*d* to be located at different virtual memory addresses in private memory pages 152-*b* allocated to each virtual machine 160-*a*. As such, memory management application 140 needs to search and locate identical libraries at different virtual memory addresses in each private memory page 152-*b* to perform memory de-duplication, thereby increasing cost, complexity and performance of memory de-duplication techniques.

The dynamic linker application 146 solves these and other problems by implementing enhanced prelinking techniques for software programs 142 to improve performance of the memory management application 140 in a virtual system. In those cases where multiple virtual machines 160-*a* utilize identical software programs 142 (e.g., a system program or an application program) and associated software libraries 156-*d*, the dynamic linker application 146 implements enhanced prelinking techniques that removes a randomization component for relocation operations of the associated software libraries 156-*d*, thereby allowing the associated libraries 156-*d* to be stored using a known virtual address space in different private memory pages 152-*b*. The memory management application 140 may use a memory management technique, such as memory de-duplication, to locate multiple private memory pages 152-*b* storing the identical software libraries 156-*d* using the known virtual address space, and transform the multiple private memory pages 152-*b* into a shared memory page 154-*c* for the virtual machines 160-*a*. This allows more efficient memory sharing in a virtual environment, and potentially enables virtual machines 160-*a* to be more dynamic, power efficient and cost efficient.

Figure 2:
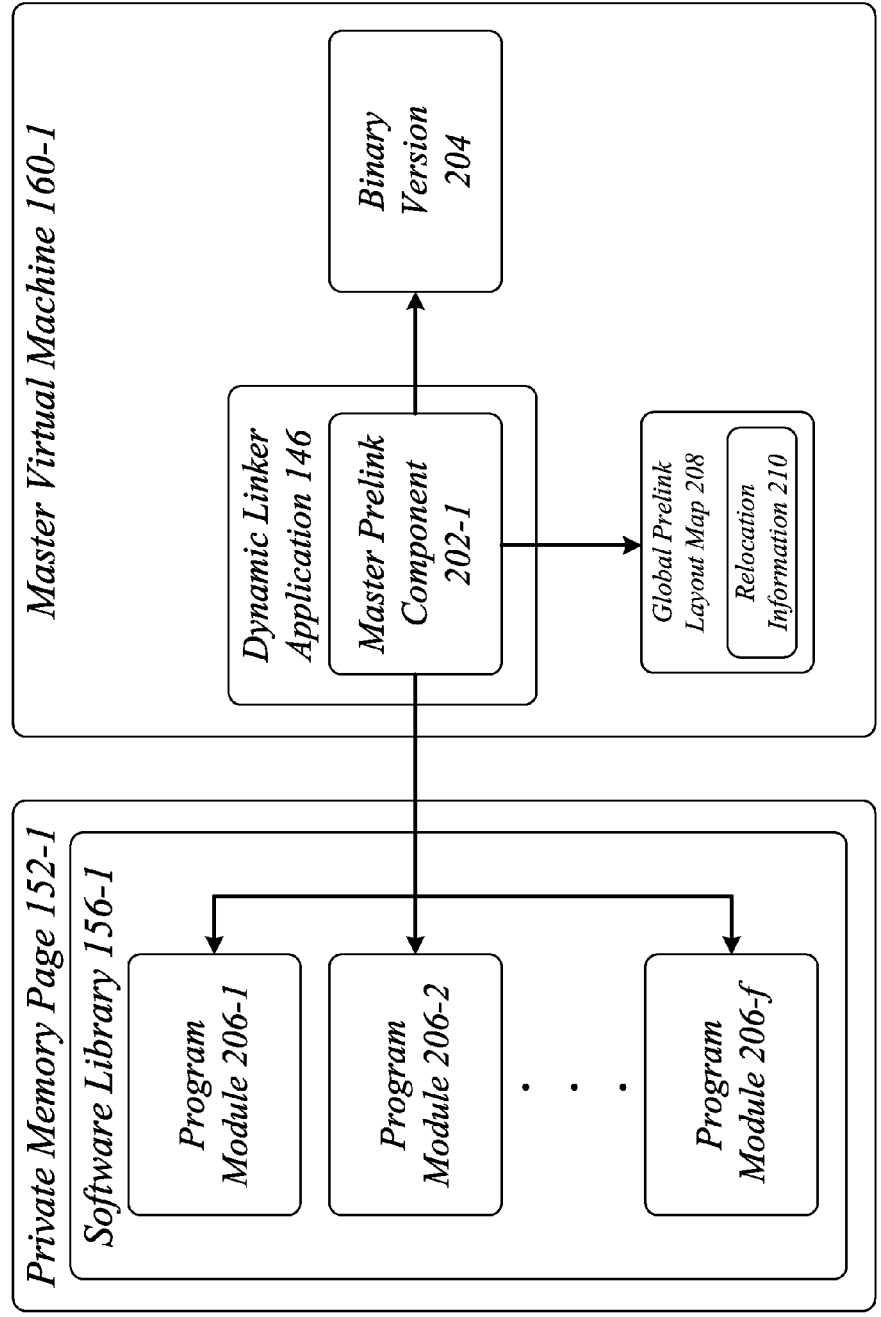
FIG. 2 illustrates an embodiment of a first operating environment for a memory management apparatus of a virtual machine.

FIG. 2 illustrates an embodiment of an operating environment 200 for the memory management apparatus 100. The operating environment 200 illustrates an exemplary implementation of the dynamic linker application 146 as executed by the processor circuit 130. More particularly, the operating environment 200 illustrates a more detailed block diagram and operation for the master virtual machine 160-1 implementing a master prelink component 202-1 for the dynamic linker application 146.

As previously described with reference to FIG. 1, the dynamic linker application 146 is operative on the processor circuit 130 to perform dynamically link a binary version 204 of the software program 142 with associated program modules 206-*f* at run-time of the binary version 204 on the processor circuit 130.

A binary version 204 of the software program 142 may comprise a compiled version of source code. Examples for the binary version 204 of the software program 142 may include without limitation a binary object, a binary file, an executable file, and so forth. In general, a computer program such as software program 142 is written as source code statements in a high level language which is easy for a human being to understand. As the computer programs are actually executed, a computer responds to machine code, which consists of instructions comprised of binary signals that directly control the operation of a central processing unit (CPU), such as the processing circuit 130. A special program called a compiler is used to read the source code and to convert its statements into the machine code instructions of the specific CPU. The machine code instructions thus produced are platform dependent, that is, different computer devices have different CPUs with different instruction sets indicated by different machine codes.

The program modules 206-*f* may comprise various program modules from one or more of the software libraries 156-*d*, shown as software library 156-1 in FIG. 2. The dynamic linker application 146 may link the program modules 206-*f* to the binary version 204 of the software program 142 during run-time of the binary version 204 on the processor circuit 130.

To perform dynamic linking, the master virtual machine 160-1 may implement one or more components 202-*e* of the dynamic linker application 146. One or more of the components 202-*e* may be arranged to perform various prelinking operations to prelink the binary version 204 of the software program 142 with associated program modules 206-*f* from one or more software libraries 156-*d* just before run-time of the binary version 204 on the processor circuit 130. Prelinking the software program 142 with associated program modules 206-*f* reduces program load time for the loader application 144 when a user actually desires to initiate execution of the software program 142.

As shown in FIG. 2, for example, the master virtual machine 160-1 may implement a master prelink component 202-1 of the dynamic linker application 146. The master prelink component 202-1 may be generally arranged to perform prelinking operations for a software program 142 and associated software libraries 156-*d* for the master virtual machine 160-1, which is then used as a template for one or more guest virtual machines 160-2, 160-3.

In one embodiment, the master prelink component 202-1 may be arranged to relocate a first set of program modules 206-*f* for a first binary version 204 of the software program 142 for the master virtual machine 160-1 using a first set of virtual memory addresses from a private memory segment allocated to the master virtual machine 160-1, such as the first private memory page 152-1.

In general, relocation is the process of assigning load addresses to various parts of a program and adjusting the code and data in the program to reflect the assigned addresses. The master prelink component 202-1 performs relocation in conjunction with symbol resolution, which is the process of searching program modules 206-*f* to replace symbolic references or names of the program modules 206-*f* with actual usable addresses in the memory unit 150 before running the software program 142. Relocation operations are typically done in two stages. In a first stage, each object file has various sections like code, data, bss segments, and so forth. To combine all the objects into a single executable, the master prelink component 202-1 merges all sections of similar type into a single section of that type. The master prelink component 202-1 then assigns run time addresses to each section and each symbol. At this point, the code (functions) and data (global variables) will have unique run time addresses. In a second stage, each section refers to one or more symbols which should be modified so that they point to the correct run time addresses based on information stored in a relocation table in the object file. The relocation table is a list of pointers created by a compiler or assembler and stored in the object or executable file. Each entry in the relocation table, sometimes referred to as a "fixup," is a pointer to an address in the object code that must be changed when the master prelink component 202-1 relocates the program. Fixups are designed to support relocation of the program as a complete unit. In some cases, each fixup in the relocation table is itself relative to a base address of zero, so the fixups themselves must be changed as the master prelink component 202-1 moves through the relocation table.

Once the master prelink component 202-1 relocates the program modules 206-*f* for the binary version 204 of the software program 142, the master prelink component 202-1 may store relocation information 210 for the program modules 206-*f* in a global prelink layout map 208 for use by other virtual machines of the electronic device 120, such as the guest virtual machines 160-2, 160-3, for example.

Figure 3:
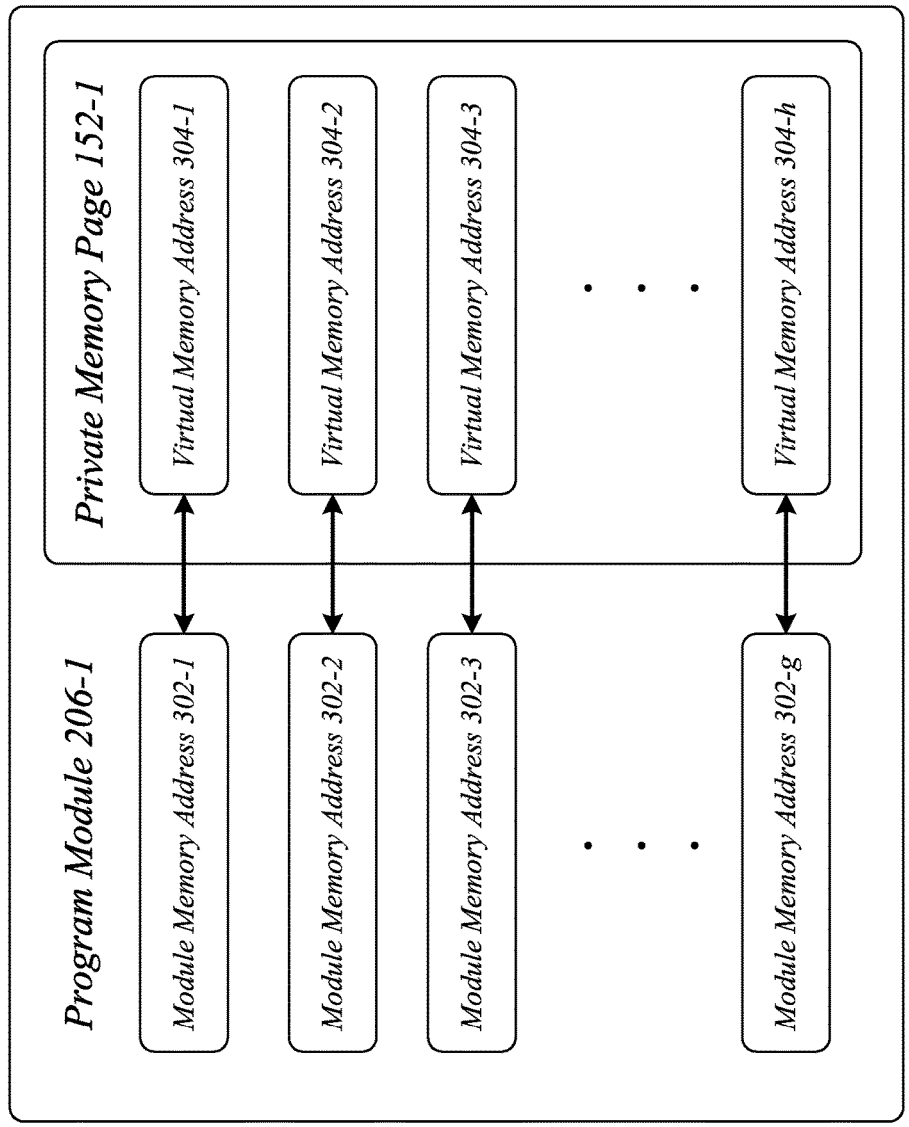
FIG. 3 illustrates an embodiment of a second operating environment for a memory management apparatus of a virtual machine.

FIG. 3 illustrates an embodiment of an operating environment 300 for the memory management apparatus 100. The operating environment 300 illustrates an exemplary implementation of relocation operations performed by the master prelink component 202-1 of the dynamic linker application 146 on a single exemplary program module 206-1. It may be appreciated that the relocation operations described for the program module 206-1 may be performed for other program modules in the set of program modules 206-*f*.

Relocating a program module 202-1 involves iterating through each address in the program module 206-1 and replacing it with a real address as determined by a location of the program module 206-1 in a virtual address space of a private memory segment of the memory unit 150 allocated to the master virtual machine 160-1. As shown in FIG. 3, the master prelink component 202-1 relocates the program module 206-1 from the first set of program modules 206-*f* by changing each module address 302-*g* referenced in the program module 202-1 to a virtual memory address 304-*h* from the first set of virtual memory addresses of the first private memory page. For example, a module address 302-1 may be changed to a virtual memory address 304-1, a module address 302-2 may be changed to a virtual memory address 304-2, and so forth. Once relocation operations are completed for the program module 206-1, the master prelink component 202-1 may store relocation information 210 in the global prelink layout map 208. The relocation information 210 may comprise a mapping between each module address 302-*g* for the program module 206-1 from the first set of program modules 206-*f* and each virtual memory address 304-*h* from the first set of virtual memory addresses 304-*h* of the first private memory page 152-1. The master prelink component 202-1 may then begin relocation operations for a next program module 206-2. This process continues until the master prelink component 202-1 relocates all program modules in the set of program modules 206-*f*, and stores corresponding relocation information 210 in the global prelink layout map 208. The binary version 204 of the software program 142 is now prelinked with the associated program modules 206-*f*, and is ready for the loader application 144 to load into the memory unit 150 when a user initiates execution of the binary version 204.

Figure 4:
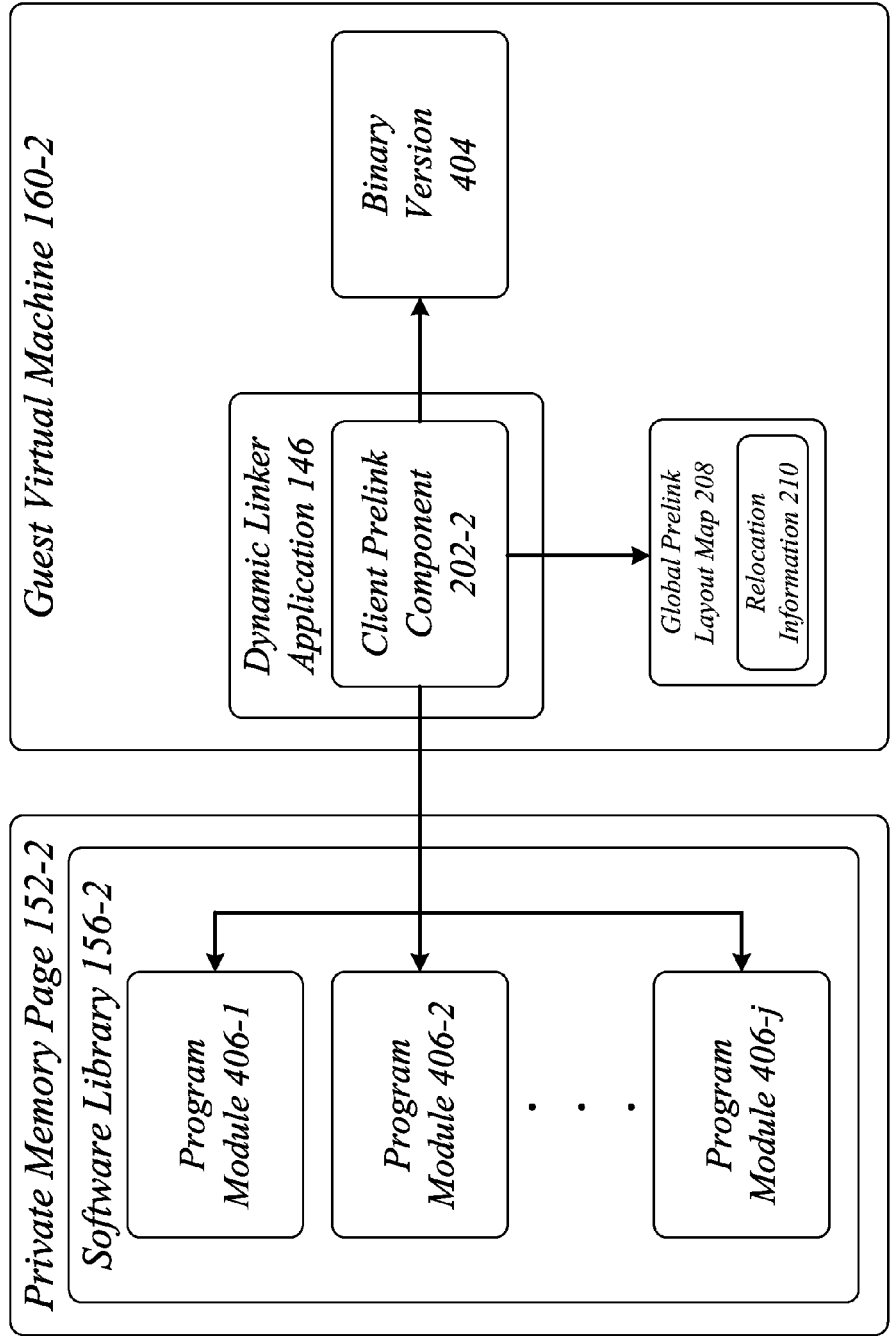
FIG. 4 illustrates an embodiment of a third operating environment for a memory management apparatus of a virtual machine.

FIG. 4 illustrates an embodiment of an operating environment 400 for the memory management apparatus 100. The operating environment 400 illustrates an exemplary implementation of the dynamic linker application 146 as executed by the processor circuit 130. More particularly, the operating environment 400 illustrates a more detailed block diagram and operation for the guest virtual machine 160-2 implementing a client prelink component 202-2 for the dynamic linker application 146.

As previously described with reference to FIG. 1, the dynamic linker application 146 is operative on the processor circuit 130 to link a binary version 204 of the software program 142 with associated program modules 206-*f* at run-time of the binary version 204 on the processor circuit 130. Similarly, the dynamic linker application 146 is operative on the processor circuit 130 to link a binary version 404 of the software program 142 with associated program modules 406-*j* at run-time of the binary version 404 on the processor circuit 130. The binary versions 204, 404 are identical in that they are copies of the same software program 142, and not necessarily the same binary file.

As with the program modules 206-*f*, the program modules 406-*j* may comprise various program modules from one or more of the software libraries 156-*d*, shown as software library 156-2 in FIG. 4. The dynamic linker application 146 may link the program modules 406-*j* to the binary version 404 of the software program 142 during run-time of the binary version 404 on the processor circuit 130.

As shown in FIG. 4, the dynamic linker application 146 may comprise a client prelink component 202-2 operative on the processor circuit 130 to receive the global prelink layout map 208 generated by the master prelink component 202-1, and retrieve the relocation information 210 from the global prelink layout map 208. The relocation information 210 may comprise a mapping between each module address 302-*g* for the program module 206-1 from the first set of program modules 206-*f* and each virtual memory address 304-*h* from the first set of virtual memory addresses 304-*h* of the first private memory page 152-1. The client prelink component 202-2 may use the relocation information 110 as a template to relocate a second set of program modules 406-*j* for a second binary version 404 of the software program 142 for the guest virtual machine 160-2 using a second set of virtual memory addresses from a second private memory page 152-2 allocated to the guest virtual machine 160-2. The binary versions 204, 404 and associated program modules 206-*f*, 406-*j*, respectively, are now prelinked with the same set of virtual memory addresses in the different private memory segments allocated to the virtual machines 160-1, 160-2, respectively.

Figure 5:
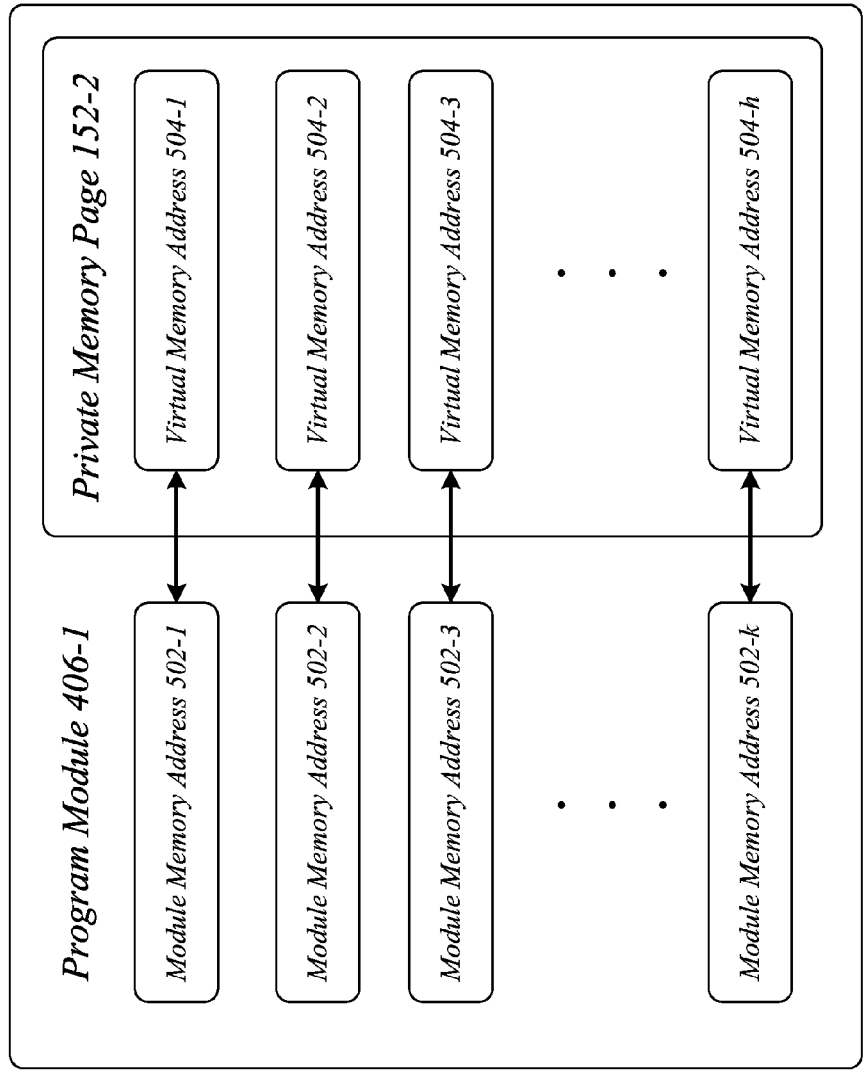
FIG. 5 illustrates an embodiment of a fourth operating environment for a memory management apparatus of a virtual machine.

FIG. 5 illustrates an embodiment of an operating environment 500 for the memory management apparatus 100. The operating environment 500 illustrates an exemplary implementation of relocation operations performed by the client prelink component 202-2 of the dynamic linker application 146 on a single exemplary program module 406-1. It may be appreciated that the relocation operations described for the program module 406-1 may be performed for other program modules in the set of program modules 406-*j*.

As shown in FIG. 5, the client prelink component 202-2 relocates the program module 406-1 from the second set of program modules 406-*j* by changing each module address 502-*k* referenced in the program module 202-1 to a virtual memory address 504-*h* from the second set of virtual memory addresses 504-*h* of the second private memory page 152-2. For example, a module memory address 502-1 may be changed to a virtual memory address 504-1, a module memory address 502-2 may be changed to a virtual memory address 504-2, and so forth. Once relocation operations are completed for the program module 406-1, the client prelink component 202-2 may then begin relocation operations for a next program module 406-2. This process continues until the client prelink component 202-2 relocates all program modules in the set of program modules 406-*j*. The binary version 404 of the software program 142 is now prelinked with the associated program modules 406-*j*, and is ready for the loader application 144 to load into the memory unit 150 when a user initiates execution of the binary version 404.

Since the client prelink component 202-2 used the relocation information 210 from the global prelink layout map 208 for its relocation operations, one or more relocated virtual memory addresses 304-*h* of the first set of virtual memory addresses 304-*h* of the first private memory page 152-1 now matches one or more relocated virtual memory addresses 504-*h* of the second set of virtual memory addresses 504-*h* of the second private memory page 152-2. As such, the dynamic linker application 146 may pass the known virtual memory addresses 304-*h*, 504-*h* to the memory management application 140.

The memory management application 140 may use the known virtual memory addresses 304-*h*, 504-*h* as a starting point to look for candidates suitable for memory de-duplication operations. The memory management application 140 may retrieve the private memory pages 152-1, 152-2 from the memory unit 150 using one of the known virtual memory addresses 304-*h*, 504-*h*, such as base virtual memory addresses 304-1, 504-1, for example. The memory management application 140 may compare the private memory pages 152-1, 152-2 to determine whether there is a match of identical content. If there is a match, the memory management application 140 may merge the private memory pages 152-1, 152-2 into a single shared memory page 154-1. The shared memory page 154-1 may now be accessible by the virtual machines 160-1, 160-2 that generated the private memory pages 152-1, 152-2. If one of the virtual machines 160-1, 160-2 modifies the shared memory page 154-1, the memory management application 140 may convert the shared memory page 154-1 back into the private memory pages 152-1, 152-2 since they now have non-duplicative content. This process may continue for a shared memory page 154-2, a shared memory page 154-3, and so on, until all duplicate private memory pages 152-$b$ are merged into a shared memory page 154-$c$.

Figure 6:
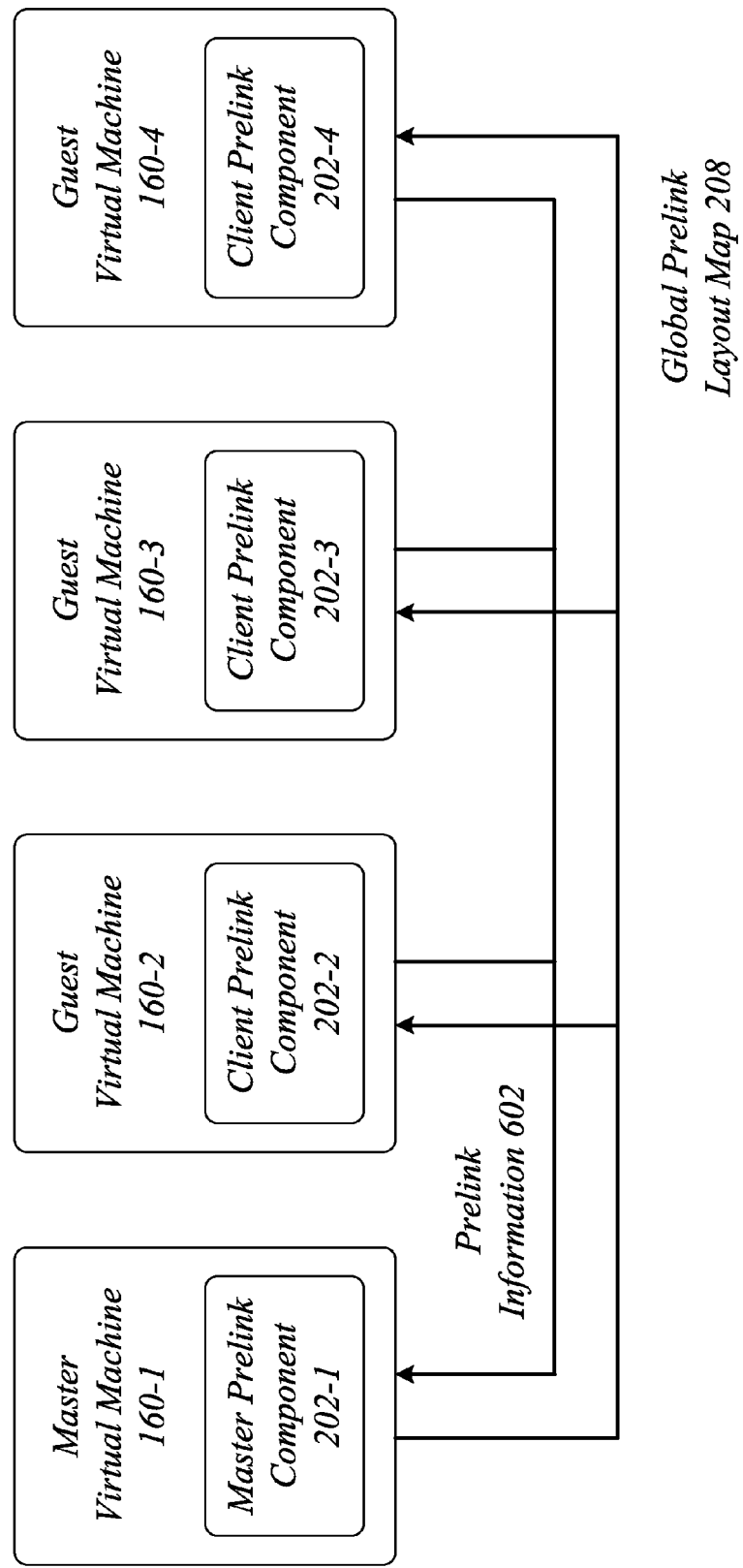
FIG. 6 illustrates an embodiment of a fifth operating environment for a memory management apparatus of a virtual machine.

FIG. 6 illustrates an embodiment of an operating environment 600 for the memory management apparatus 100. The operating environment 600 illustrates an exemplary implementation of sharing prelink information 602 between the master prelink component 202-1 executing in the master virtual machine 160-1, and the client prelink components 202-2, 202-3 and 202-4 executing in the guest virtual machines 160-2, 160-3 and 160-4, respectively.

As shown in FIG. 6, the master prelink component may receive prelink information 602 prior to relocating the first set of program modules 206-$f$, and use the prelink information 602 to relocate the first set of program modules 206-$f$. The prelink information 602 may be used as input to a prelink mapping algorithm designed to generate an address layout for prelinking operations. In general, the prelink information 602 may comprise any information that may be used to optimize relocation operations performed by the master prelink component 202-1, specific examples of which are given below.

In one embodiment, the prelink information 602 may originate from a single virtual machine, such as the master virtual machine 160-1. The master prelink component 202-1 executing within the master virtual machine 160-1 may generate prelink information 602 for information known to the master virtual machine 160-1 alone. The master prelink component 202-1 may use the prelink information 602 to calculate an optimal layout of virtual memory addresses 304-$h$ for prelinking operations performed on the master virtual machine 160-1.

By way of example, the prelink information 602 may comprise a graph of program modules 206-$f$ from the first set of program modules 206-$f$ that will be loaded at a same time on the master virtual machine 160-1. The master prelink component 202-1 may then assign different sub-sets of virtual memory addresses 304-$h$ from the first set of virtual memory addresses 304-$h$ to the program modules 206-$f$ in the graph to avoid loading multiple program modules 206-$f$ using a same set of addresses. For instance, the master prelink component 202-1 may scan private memory pages 152-$b$ stored in a private memory segment allocated to the master virtual machine 160-1 for every executable to be prelinked, generate a graph of software libraries 156-$d$ that will be loaded at the same time, and then calculate or "layout" sets of virtual memory addresses 304-$h$ for each software library 156-$d$ such that two software libraries 156-$d$ (e.g., 156-1, 156-2) will never be loaded at the same or overlapping virtual memory address 304-$h$. These offsets are then stored in the shared object files themselves, and symbol tables and segment addresses are all adjusted to reflect addresses based on a chosen base address.

Additionally or alternatively, the prelink information 602 may originate from multiple virtual machines, such as the master virtual machine 160-1 and one or more guest virtual machines 160-2, 160-3 and/or 160-4. Each of the client prelink components 202-2, 202-3 and 202-4 executing within the guest virtual machines 160-2, 160-3 and 160-4, respectively, may generate and send corresponding sets of prelink information 602 to the master prelink component 202-1. The master prelink component 202-1 may receive prelink information 602 from the guest virtual machines 160-2, 160-3 and 160-4, and use the different sets of prelink information 602 to calculate an optimal layout of virtual memory addresses for prelinking operations.

By way of example, assume the prelink information 602 comprises a first graph of program modules 206-$f$ from the first set of program modules 206-$f$ that will be loaded at a same time on the master virtual machine 160-1, and a second graph of program modules 406-$j$ from a second set of program modules 406-$j$ that will be loaded at a same time on the guest virtual machine 160-2. The master prelink component 202-1 may then assign different sub-sets of virtual memory addresses 304-$h$ from the first set of virtual memory addresses 304-$h$ to the first set of program modules 206-$f$ in the first graph, and different sub-sets of virtual memory addresses 504-$h$ from the second set of virtual memory addresses 504-$h$ to the second set of program modules 406-$j$ in the second graph. Taking into account the prelink information 602 from the guest virtual machine 160-2 allows the master prelink component 202-1 to layout virtual memory addresses for the master virtual machine 160-1 in a template manner that does not negatively impact the guest virtual machine 160-2, such as using virtual memory addresses not available or already in use by the guest virtual machine 160-2, for example.

Referring again to FIG. 1, the electronic device 120 may be coupled to various computing and/or communications platforms that include platform components typically found in such platforms. For example, the electronic device 120 may include a computing platform having various platform components, such as input/output (I/O) devices, I/O controllers, GPUs, power supplies, thermal management components, and so forth. In one embodiment, the electronic device 120 may comprise a computing device such as a mobile computing device (e.g., a notebook, tablet computer, smart phone, etc.) or a fixed computing device (e.g., a personal computer, a desktop computer, a server, etc.) having a display operative to present information stored in the memory unit 150. The display may comprise any digital display device suitable for the electronic device 120. For instance, the display may be implemented by a liquid crystal display (LCD) such as a touch-sensitive, color, thin-film transistor (TFT) LCD, a plasma display, organic light emitting diode (OLED) displays, a cathode ray tube (CRT) display, or other type of suitable visual interface for displaying content to a user of the electronic device 120. The display may further include some form of a backlight or brightness emitter as desired for a given implementation.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 7 illustrates one embodiment of a logic flow 700. The logic flow 700 may be representative of some or all of the operations executed by one or more embodiments described herein, such as the memory management apparatus 100. More particularly, the logic flow 700 illustrates prelink operations performed by the master prelink component 202-1 and/or the client prelink component 202-2 of the dynamic linker application 146.

In the illustrated embodiment shown in FIG. 7, the logic flow 700 may relocate a first set of program modules for a first binary version of a software program for a first virtual machine using a first set of virtual memory addresses from a first private memory page allocated to the first virtual machine at block 702. For example, the master prelink component 202-1 of the dynamic linker application 146 executing in the master virtual machine 160-1 may relocate a first set of program modules 206-1, 206-2 for a first binary version 204 of a software program 142 for the master virtual machine 160-1 using a first set of virtual memory addresses 304-$h$ from a first private memory page 152-1 allocated to the master virtual machine 160-1.

The logic flow 700 may store relocation information for the first set of program modules in a global prelink layout map at block 704. For example, the master prelink component 202-1 may store relocation information 210 for the first set of program modules 206-1, 206-2 in a global prelink layout map 208 in a shared memory page 152-3 of the memory unit 150 accessible by the master virtual machine 160-1 and a guest virtual machine 160-2. The global prelink layout map 208 may be stored in shared memory segment accessible by all of the virtual machines 160-1, 160-2, 160-3 and 160-4, such as a shared memory page 152-3. Alternatively, the global prelink layout map 208 may be communicated as messages passed between the virtual machines 160-1, 160-2, 160-3 and 160-4.

The logic flow 700 may retrieve the global prelink layout map at block 706. For example, the client prelink component 202-2 of the dynamic linker application 146 executing on the guest virtual machine 160-2 may retrieve the global prelink layout map 208 and the relocation information 210 from the shared memory page 152-3.

The logic flow 700 may relocate a second set of program modules for a second binary version of the software program for a second virtual machine using a second set of virtual memory addresses from a second private memory page allocated to the second virtual machine based on the global prelink layout map. For example, the client prelink component 202-2 may analyze the relocation information 210, and use the relocation information 210 as a template to relocate a second set of program modules 406-1, 406-2 for a second binary version 404 of the software program 142 for the guest virtual machine 160-2 using a second set of virtual memory addresses 504-$h$ from a second private memory page 152-2 allocated to the guest virtual machine 160-2.

FIG. 8 illustrates one embodiment of a logic flow 800. The logic flow 800 may be representative of some or all of the operations executed by one or more embodiments described herein, such as the memory management apparatus 100. More particularly, the logic flow 800 illustrates relocation operations performed by the master prelink component 202-1 and/or the client prelink component 202-2 of the dynamic linker application 146.

In the illustrated embodiment shown in FIG. 8, the logic flow 800 may relocate a program module from the first set of program modules by changing each module address referenced in the program module to a virtual memory address from the first set of virtual memory addresses of the first private memory page at block 802. For example, the master prelink component 202-1 may relocate a program module 206-1 from the first set of program modules 206-1, 206-2 by changing each module address 302-$g$ referenced in the program module 206-1 to a virtual memory address 304-$h$ from the first set of virtual memory addresses 304-$h$ of a private memory segment allocated to the master virtual machine 160-1, such as the first private memory page 152-1, for example.

The logic flow 800 may relocate a program module from the second set of program modules by changing each module address referenced in the program module to a virtual memory address from the second set of virtual memory addresses of the second private memory page, wherein the first set of virtual memory addresses of the first private memory page matches the second set of virtual memory addresses of the second private memory page at block 804. For example, the client prelink component 202-2 may relocate a program module 406-1 from the second set of program modules 406-1, 406-2 by changing each module address 502-$k$ referenced in the program module to a virtual memory address 504-$h$ from the second set of virtual memory addresses 504-$h$ of a private memory segment allocated to the guest virtual machine 160-2, such as the second private memory page 152-2, for example. The first set of virtual memory addresses 302-$g$ of the first private memory page 152-1 matches the second set of virtual memory addresses 504-$h$ of the second private memory page 152-2 since both address layouts use the same relocation information 210.

Figure 9:
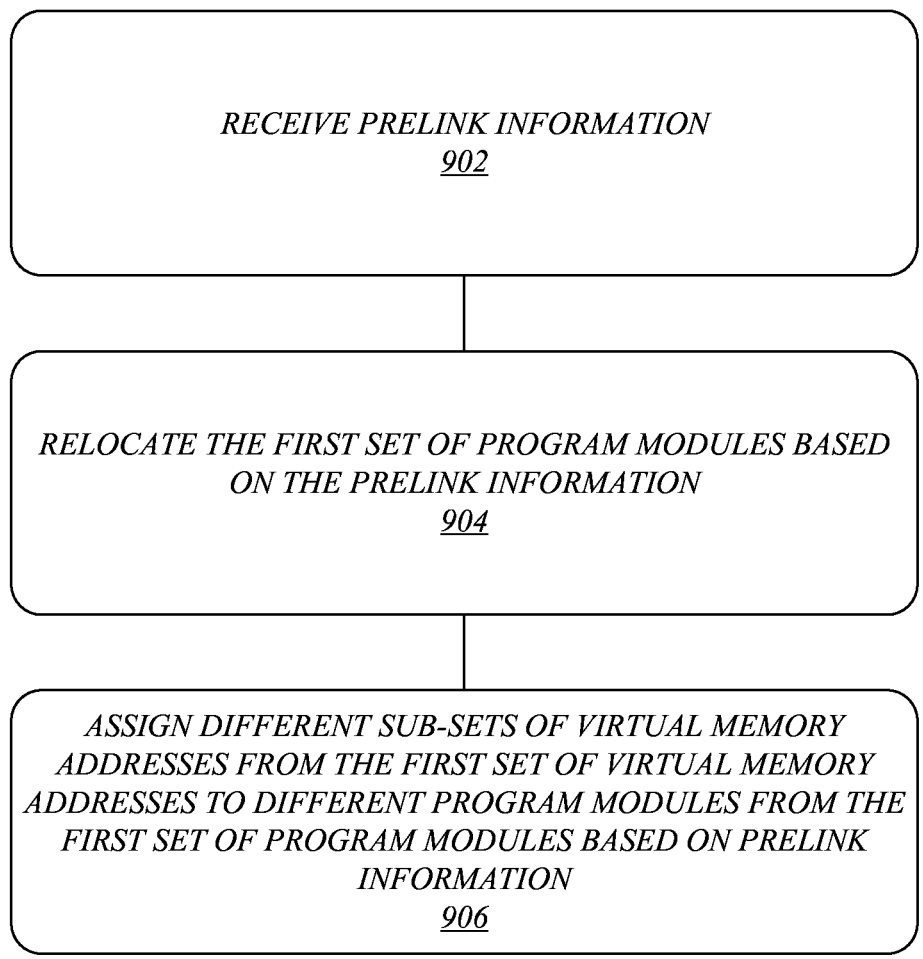
FIG. 9 illustrates an embodiment of a third logic flow for a memory management apparatus of a virtual machine.

FIG. 9 illustrates one embodiment of a logic flow 900. The logic flow 900 may be representative of some or all of the operations executed by one or more embodiments described herein, such as the memory management apparatus 100. More particularly, the logic flow 900 illustrates relocation operations performed by the master prelink component 202-1 and/or the client prelink component 202-2 of the dynamic linker application 146 based on different types and sources of prelink information 602.

In the illustrated embodiment shown in FIG. 9, the logic flow 900 may receive prelink information at block 902. In one embodiment, for example, the master prelink component 202-1 may receive a single set of prelink information 602 from the master virtual machine 160-1. Additionally or alternatively, the master prelink component 202-1 may receive different sets of prelink information 602 from various guest virtual machines, such as guest virtual machines 160-2, 160-3 and/or 160-4.

The logic flow 900 may relocate the first set of program modules based on the prelink information at block 904. In one embodiment, for example, the master prelink component 202-1 may relocate the first set of program modules 206-$f$ based on the prelink information 602 from only the master virtual machine 160-1. In one embodiment, for example, the master prelink component 202-1 may relocate the first set of program modules 206-$f$ based on the different sets of prelink information 602 from guest virtual machines 160-2, 160-3 and/or 160-4. In this embodiment, the master prelink component 202-1 may integrate the different sets of prelink information 602 into a superset, and use the superset of information as input to the prelink mapping algorithm.

The logic flow 900 may assign different sub-sets of virtual memory addresses from the first set of virtual memory addresses to different program modules from the first set of program modules based on prelink information at block 906. For example, the master prelink component 202-1 may perform relocation operations by assigning different sub-sets of virtual memory addresses 304-$h$ from the first set of virtual memory addresses 304-$h$ to different program modules 206-$f$ from the first set of program modules 206-$f$ based on the prelink information 602.

FIG. 10 illustrates one embodiment of a logic flow 1000. The logic flow 1000 may be representative of some or all of the operations executed by one or more embodiments described herein, such as the memory management apparatus 100. More particularly, the logic flow 1000 illustrates memory de-duplication operations performed by the memory management application 140 executing on the processor circuit 130 in the master virtual machine 160-1.

In the illustrated embodiment shown in FIG. 10, the logic flow 1000 may retrieve the first private memory page allocated to the first virtual machine and the second private memory page allocated to the second virtual machine at block 1002. For example, the memory management application 140 may retrieve the first private memory page 152-1 allocated to the master virtual machine 160-1 and the second private memory page 152-2 allocated to the guest virtual machine 160-2. The memory management application 140 may be programmed to retrieve the first and second private memory pages 152-1, 152-2 based on a known set of virtual memory address 304-$h$, 504-$h$ passed to the memory management application 140 from the dynamic linker application 146 after performing prelinking operations for the binary versions 204, 404 of the software program 142 with one or more software libraries 156-$d$ in the memory unit 150.

The logic flow 1000 may compare the first and second private memory pages for duplicative content at block 1004. For example, the memory management application 140 may compare the first and second private memory pages 152-1, 152-2 for duplicative content.

The logic flow 1000 may merge the first and second private memory pages to form a shared memory page when the first and second private memory pages have duplicative content at block 1006. For example, the memory management application 140 may merge the first and second private memory pages 152-1, 152-2 into a single shared memory page 154-1 when the first and second private memory pages 152-1, 152-2 are determined to have duplicative content.

Figure 11:
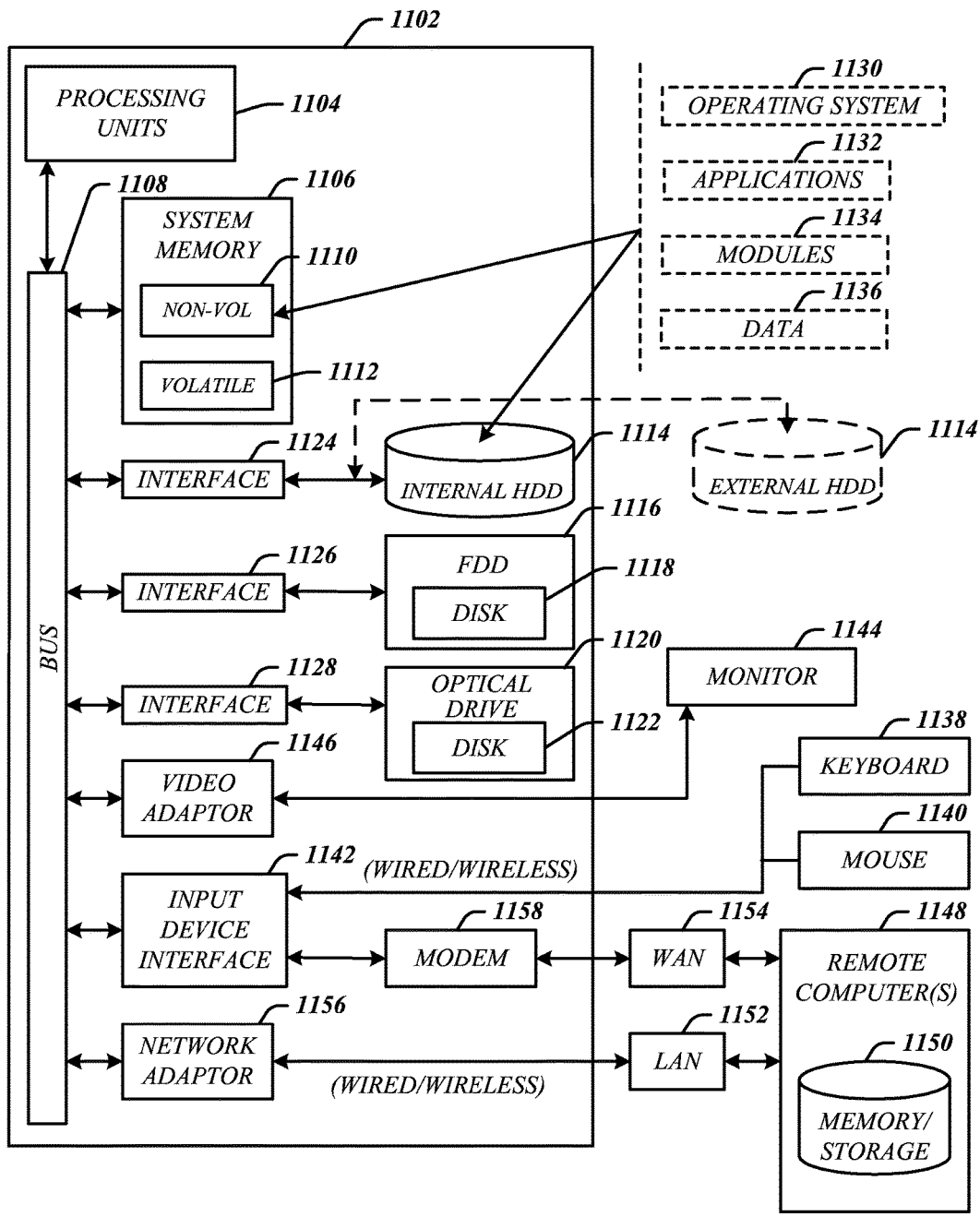
FIG. 11 illustrates an embodiment of a computing architecture suitable for virtualization into multiple virtual machines.

FIG. 11 illustrates an embodiment of an exemplary computing architecture 1100 suitable for implementing various embodiments as previously described, such as the memory management apparatus 100. In one embodiment, the computing architecture 1100 may comprise or be implemented as part of an electronic device, such as the electronic device 120, among others. The embodiments are not limited in this context.

As used in this application, the terms "apparatus" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises multiple processing units 1104, a system memory 1106 and a system bus 1108. The processing units 1104 may comprise, for example, the processor circuits 130, 132, the CPU 510, and/or the GPU 530.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 13114 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the memory management apparatus 100, 200 and 500.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 13114 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Elements of the various embodiments may be implemented as various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus comprising:
processing circuitry; and
non-transitory computer-readable storage media having stored thereon instructions for execution by the processing circuitry to:
scan at least one private memory page of a virtual machine to determine at least one executable to be prelinked;
generate prelink information for the at least one executable, the prelink information comprising a graph of a set of program modules to be loaded at a same time on the virtual machine for at the at least one executable;
generate a layout based on the prelink information, the layout comprising memory addresses for the set of program modules; and
relocate a program module of the set of program modules based on the layout.

2. The apparatus of claim 1, the non-transitory computer-readable storage media having stored thereon instructions for execution by the processing circuitry to assign a virtual memory address to the program module to relocate the program module.

3. The apparatus of claim 2, the layout to arrange memory addresses for one or more program modules of the set of program modules that will be loaded at the same time on the virtual machine with different or non-overlapping memory addresses.

4. The apparatus of claim 2, the non-transitory computer-readable storage media having stored thereon instructions for execution by the processing circuitry to identify a second program module as identical to the program module and relocate the second program module based on the layout.

5. The apparatus of claim 4, the non-transitory computer-readable storage media having stored thereon instructions for execution by the processing circuitry to assign the virtual memory address to the second program module to relocate the second program module.

6. The apparatus of claim 1, the non-transitory computer-readable storage media having stored thereon instructions for execution by the processing circuitry to identify a change to the program module and relocate the program module based on the layout.

7. The apparatus of claim 1, the program module associated with a binary version of a software program.

8. The apparatus of claim 7, the program module comprising a software library for the binary version of the software program.

9. The apparatus of claim 8, the software program executed by the virtual machine.

10. The apparatus of claim 1, the prelink information to be received from one or more virtual machines over a network.

11. One or more non-transitory computer-readable media to store instructions that when executed by a processor circuit causes the processor circuit to:
scan at least one private memory page of a virtual machine to determine at least one executable to be prelinked;
generate a global prelink layout map for a set of program modules to be loaded at a same time on the virtual machine for the at least one executable;
identify relocation information received from a memory page of the global prelink layout map, the relocation information comprising a mapping between an address for a program module and a virtual memory address; and
relocate the program module based on the relocation information.

12. The one or more non-transitory computer-readable media of claim 11, the virtual memory address associated with a virtual machine.

13. The one or more non-transitory computer-readable media of claim 11, the program module associated with a binary version of a software program.

14. The one or more non-transitory computer-readable media of claim 13, the program module comprising a software library for the binary version of the software program.

15. The one or more non-transitory computer-readable media of claim 14, the software program executed by a virtual machine.

16. The one or more non-transitory computer-readable media of claim 11, with instructions to relocate the program module from a private memory page to a shared memory page.

17. The one or more non-transitory computer-readable media of claim 16, the shared memory page comprising one or more program modules associated with a plurality of binary versions of the software program.

18. The one or more non-transitory computer-readable media of claim 11, with instructions to relocate the program modules from a first private memory page to a second private memory page.

19. A computer-implemented method, comprising:
scan at least one private memory page of a virtual machine to determine at least one executable to be prelinked;
generate a global prelink layout map for a set of program modules to be loaded at a same time on the virtual machine for the at least one executable;
relocating, by a processor circuit, a first set of program modules of the plurality of program modules for a first binary version of a software program for a first virtual machine using a first set of virtual memory addresses from a first private memory page allocated to the first virtual machine based on the global prelink layout map; and
storing relocation information for the first set of program modules in a global prelink layout map.

20. The computer-implemented method of claim 19, comprising relocating a program module from the first set of program modules by changing each module address referenced in the program module to a virtual memory address from the first set of virtual memory addresses of the first private memory page.

21. The computer-implemented method of claim 19, comprising receiving prelink information from the first virtual machine and relocating the first set of program modules based on the prelink information.

22. The computer-implemented method of claim 21, comprising assigning different sub-sets of virtual memory addresses from the first set of virtual memory addresses to different program modules from the first set of program modules based on prelink information.

23. The computer-implemented method of claim 19, comprising:
retrieving the global prelink layout map; and
relocating a second set of program modules for a second binary version of the software program for a second virtual machine using a second set of virtual memory addresses from a second private memory page allocated to the second virtual machine based on the global prelink layout map.

24. The computer-implemented method of claim 23, comprising relocating a program module from the second set of program modules by changing each module address referenced in the program module to a virtual memory address from the second set of virtual memory addresses of the second private memory page, wherein the first set of virtual memory addresses of the first private memory page matches the second set of virtual memory addresses of the second private memory page.

25. The computer-implemented method of claim 23, comprising receiving prelink information from the first and second virtual machines and relocation the first set of program modules based on the prelink information.

* * * * *